United States Patent

Borras et al.

Patent Number: 5,465,409
Date of Patent: Nov. 7, 1995

[54] RADIO ARCHITECTURE WITH DUAL FREQUENCY SOURCE SELECTION

[75] Inventors: Jaime A. Borras, Hialeah; Mark J. Chambers, Plantation; Jesus S. Pena Finol, Coral Springs; Armando J. Gonzalez, Miami; Cesar W. Carralero, Hialeah; Sayed H. Beladi, Plantation; Levent Y. Erbora, Miami, all of Fla.

[73] Assignee: Motorola, Inc., Schaumburg, Ill.

[21] Appl. No.: 206,704

[22] Filed: Mar. 7, 1994

[51] Int. Cl.$^6$ .................................. H04B 1/44; H04J 1/00
[52] U.S. Cl. .......................... 455/260; 455/76; 455/84; 455/86; 370/69.1; 370/50
[58] Field of Search ................................ 455/76, 82, 83, 455/84, 86, 260; 370/69.1, 121, 77, 24, 29, 30, 50, 95.1; 307/473, 59; 326/475, 62; 375/5, 216–217

[56] References Cited

U.S. PATENT DOCUMENTS

| | | | |
|---|---|---|---|
| 4,596,940 | 6/1986 | Schuppan et al. | 307/443 |
| 5,083,048 | 1/1992 | Kashimura | 307/473 |
| 5,153,457 | 10/1992 | Martin et al. | 307/443 |
| 5,179,721 | 1/1993 | Comroe et al. | 455/33.1 |
| 5,281,632 | 7/1993 | Yamao et al. | 370/69.1 |
| 5,293,081 | 3/1994 | Chiao et al. | 307/270 |

OTHER PUBLICATIONS

"Basic Gain Stages," Bipolar and MOS Analog and Integrated Circuit Design, Alan B. Grebene, Chapter 5, pp. 215–216. Wiley Inter–Science, 1984.

*Primary Examiner*—Reinhard J. Eisenzopf
*Assistant Examiner*—Lee Nguyen
*Attorney, Agent, or Firm*—Daniel K. Nichols

[57] ABSTRACT

A radio having two architectural platforms integrated in one integrated circuit (IC). A synthesizer controller (312) selects between an offset local oscillator (LO) synthesizer (318) and a second LO synthesizer (316) to provide a common architecture for either an Frequency Division Duplex (FDD) or Time Division Duplex (TDD) system design while providing isolation between the two frequency sources. An offset LO signal (319) is translated to an isolated LO signal 310 and combined with a main LO signal (322) to provide the FDD platform. A second LO signal (314) is translated into the isolated LO signal 310 and combined with the main LO signal (322) to provide the TDD platform. The second LO synthesizer signal (314) is common to both systems in the receive mode.

13 Claims, 2 Drawing Sheets

RADIO ARCHITECTURE WITH DUAL FREQUENCY SOURCE SELECTION

TECHNICAL FIELD

This invention relates to radio communications circuits in general and in particular to radio architecture.

BACKGROUND

The design of duplex dual conversion transceivers requires the inclusion of multiple frequency synthesizers to receive and transmit simultaneously in the same or in different frequencies for either Time Division Duplex (TDD) or Frequency Division Duplex (FDD) operation, respectively. In a FDD system the modulated intermediate frequency (IF) signal is generated with the combination of the offset local oscillator (LO) synthesizer and baseband signals. In a TDD system the second local oscillator (LO) signal is combined with the baseband signal to generate the modulated intermediate frequency which, in turn, is mixed with the main LO to produce the carder frequency.

A block diagram of a typical FDD radio is shown in FIG. 1 of the accompanying drawings. The FDD system uses three separate synthesizers a main LO 114, a second LO 116, and an offset LO 110. The offset LO synthesizer 110 supplies the intermediate frequency for the TX, transmit, path. The second LO 116 is used for the RX, receive, path. In a typical FDD system 100, an incoming audio signal 104 received at the microphone 102 is converted to an encoded audio signal, which will be referred to as TX baseband signal 108, through a controller section 106. The TX baseband signal 108 is then combined with an offset LO signal 111, generated by the offset LO synthesizer 110, at the modulator 112 to generate a modulated IF signal 124. The modulated IF signal 124 is then mixed with a main LO signal 122, generated by the main LO synthesizer 114, at the TX mixer 126. This produces a TX carrier frequency 132 that in turn is filtered at filter 134 and amplified at amplifier 138, generating an amplified RF (radio frequency) signal 140. The amplified RF signal 140 is then coupled through an antenna coupler, such as duplexer 142, to an antenna 146 where it is transmitted as RF signal 144.

In the receive, RX, path for the FDD system 100, the RF signal 144 is received at antenna 146 and coupled through the duplexer 142, for directing the RF signal to the RX path, as RX signal 148. The RX signal 148 is then amplified through amplifier 150 and filtered through filter 154. A filtered signal 130 is then mixed with the main LO signal 122 at RX mixer 128 to produce an IF carrier signal 120. The IF carrier signal 120 is fed into a zero IF section (ZIF) 118 where the IF signal is converted directly to a RX baseband frequency 156 by mixing the incoming IF carrier signal with a second LO signal 121, generated from the second LO synthesizer 116, at the same frequency as the IF carrier signal. The baseband signal 156 is then processed for timing and digital to analog conversion in the controller section 106 and output as audio at speaker 158.

In a typical TDD radio shown in FIG. 2 an audio signal 204 is received at microphone 202 and processed in a controller section 206 where the audio is converted to a an encoded audio signal which will be referred to as TX baseband signal 208. A second LO synthesizer 252 generates a second LO signal 212 which gets combined with the TX baseband signal 208 at modulator 210 to generate a modulated IF signal 214. The modulated IF signal 214 is then mixed at TX mixer 218 with a main LO signal 216, generated from a main LO synthesizer 217, to produce a TX carrier frequency signal 220. The TX carrier 220 is then amplified at amplifier 222 to generate an amplified TX carrier signal 224 and switched to the TX path at antenna switch 226 then filtered at filter 228 and transmitted at an antenna 240 as transmit RF signal 230.

In the receive mode of the TDD system, the RF signal 230 is received at antenna 240, filtered at filter 228, and switched through antenna switch 226 to the RX path as RX signal 242. The RX signal 242 is then amplified through amplifier 244 and mixed with a main LO signal 216, generated from a main LO synthesizer 217, at a RX mixer 248 to generate a RX IF carrier signal 250. The RX IF carrier signal 250 is combined with the second LO synthesizer signal 212 at a ZIF 254 to form a RX baseband signal 256. The RX baseband signal 256 is forwarded to the controller section 206 where it is processed and converted to audio at speaker 258.

The FDD and TDD systems as described by FIGS. 1 and 2 show the systems as two separate radios. A device that would provide a combination of platforms in one embodiment would be useful to system and radio designers trying to design cost effective radios while reducing design time.

DETAILED DESCRIPTION OF THE PREFERRED EMBODIMENT

Figure 1:
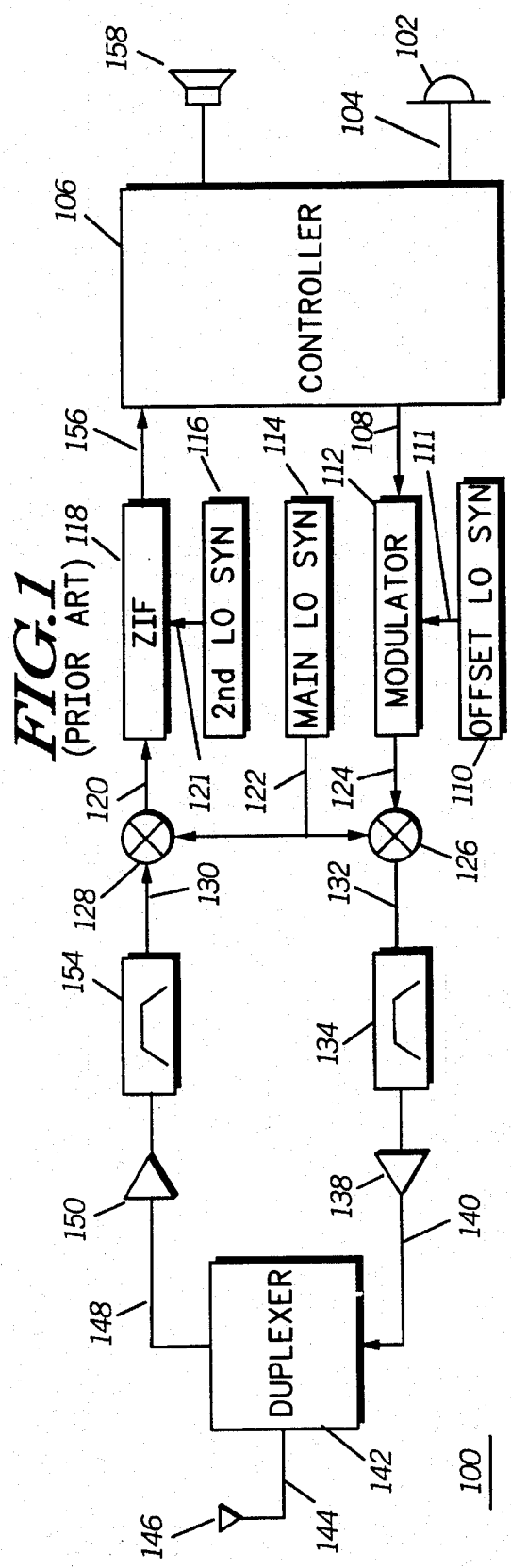
FIG. 1 is a block diagram of a prior art FDD radio platform.
Figure 2:
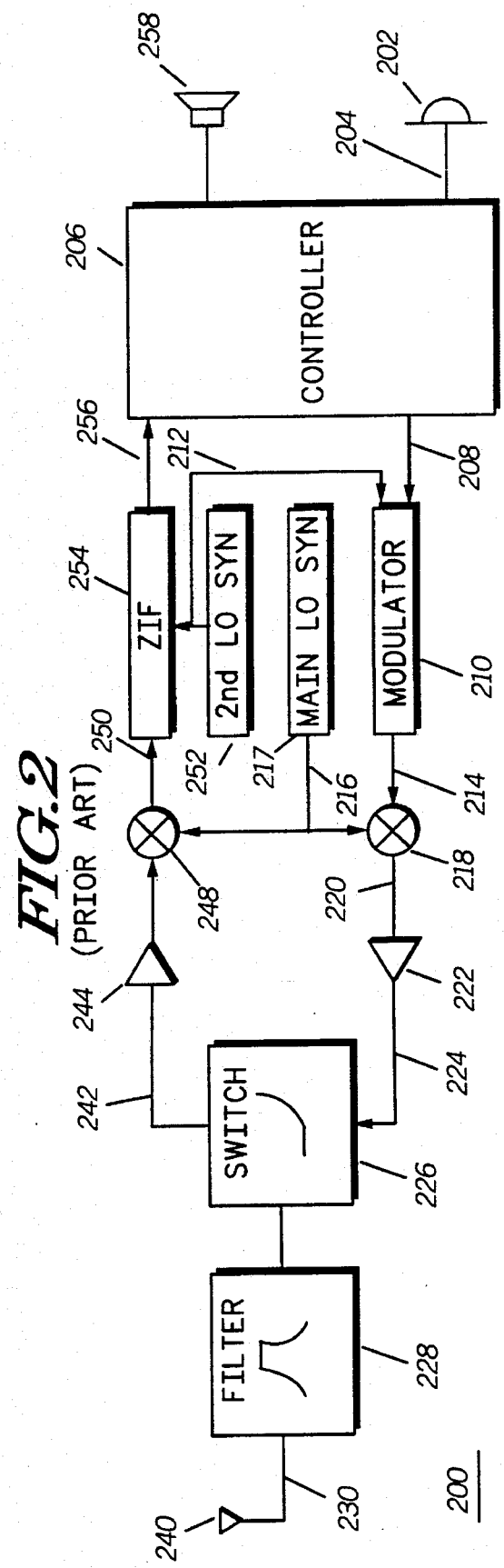
FIG. 2 is a block diagram of a prior art TDD radio platform.
Figure 3:
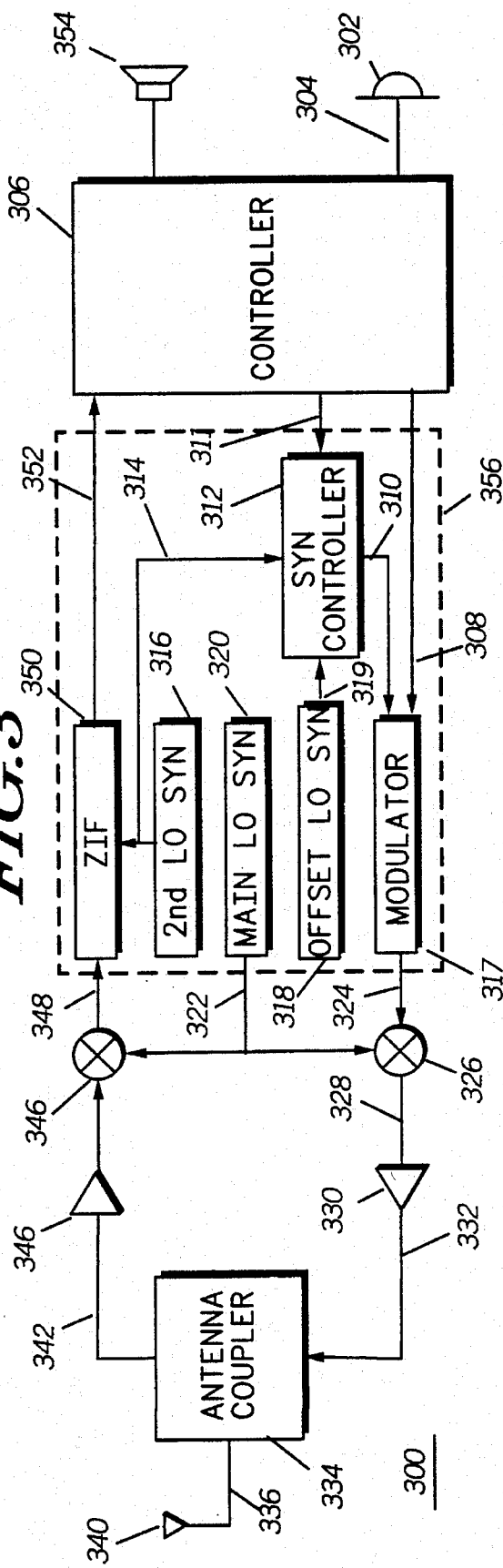
FIG. 3 is a block diagram of a dual architecture radio platform in accordance with the present invention.

In FIG. 3, a block diagram of the preferred embodiment of the invention is shown as radio 300. The radio 300 includes a controller section 306 for audio processing, timing protocol control, and analog to digital / digital to analog conversion. Also included in the radio 300 is a modulator 317, for combining and modulating a transmit signal, and a ZIF 350, for mixing and converting a receive signal down to baseband. Three synthesizers, a main local oscillator (LO) 320, a second LO 316, and an offset LO 318 generate the various LO frequencies for the transmit and receive modes of the radio 300. Radio 300 also includes, a transmitter path, including a transmit (TX) mixer 326, for generating an RF signal, and a receive path, including a receive (RX) mixer 346, for converting an incoming radio frequency (RF) signal into an intermediate frequency. In the preferred embodiment the modulator 317, ZIF 350, main LO synthesizer 320, $2^{nd}$ LO synthesizer 316, and offset LO synthesizer 318 as well as a synthesizer controller 312 can be integrated into a single integrated circuit, IC, referred to as ZIF/SYN 356.

The controller section 306 receives audio at a microphone 302 and processes it into a TX baseband signal 308. A select line 311 coming from a microprocessor (not shown), located within the controller section 306, enables the synthesizer controller 312 to access, or select, either the offset LO synthesizer 318 or the second LO synthesizer 316 and generate an isolated LO signal 310. The TX baseband signal 308 is then combined with the isolated LO signal 310 at the modulator 317 to produce a modulated IF signal 324. The modulated IF signal 324 is then mixed through TX mixer 326 with a main LO signal 322, generated from the main LO synthesizer 320, to produce a TX carrier frequency 328 that is then amplified through amplifier 330 as amplified TX carrier 332. The amplified TX carrier 332 is then coupled through to a TX path via an antenna coupler 334, and then transmitted as RF signal 336 at antenna 340.

The synthesizer controller 312 determines, via the select line 311, whether a TDD system or an FDD system is enabled. The synthesizer controller 312 is used for accessing either the offset LO synthesizer 318 or the second LO synthesizer 316. For activation of the FDD system the synthesizer controller 312 isolates the offset LO synthesizer signal 319 as isolated LO signal 310 and combines it with the TX baseband signal 308 at modulator 317 to produce the modulated IF signal 324. For activation of the TDD system the second LO synthesizer signal 314 will be processed as isolated LO signal 310 and combined with the baseband signal 308 at modulator 317 to produce the modulated IF signal 324. In the FDD system the offset LO synthesizer 318 drives the modulator 317, and in the TDD system the second LO synthesizer 316 drives the modulator 317. Being able to select either the second LO synthesizer 316 or the offset LO synthesizer 318 provides a common architecture for the design of the TDD and FDD systems.

The antenna coupler as described in the radio 300 could include an isolator, a duplexer, a circulator, or an antenna switch depending on which radio system platform is enabled. A duplexer would be used for full FDD, an antenna switch could be used for TDD mode or an FDD mode with protocol timing that allows transmitting and receiving in different time slots.

Figure 4:
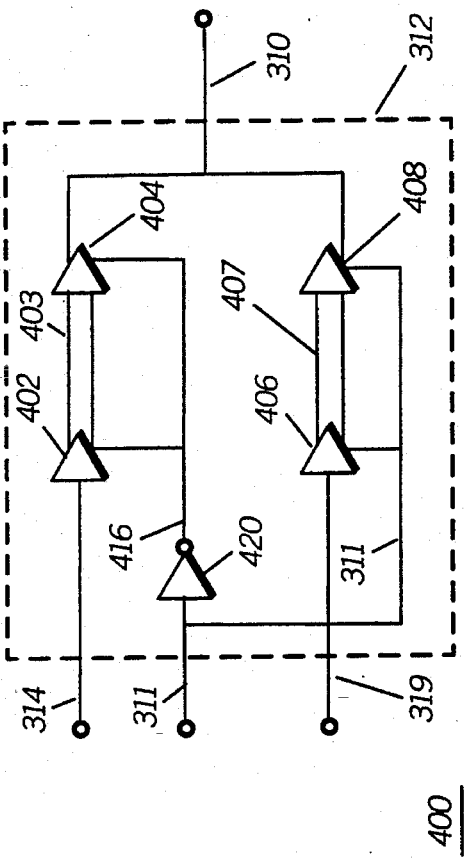
FIG. 4 is a block diagram of the synthesizer controller circuit of the dual architecture radio platform of FIG. 3.

Routing of the LO signals from either of the two synthesizer circuits, second LO synthesizer 316 or offset LO synthesizer 318, is performed using an isolator circuit scheme composed of first and second isolator circuits as shown in FIG. 4. The first isolator circuit is coupled to the offset LO synthesizer 318 and includes a first driver circuit 406 having an input coupled to the offset synthesizer and an output coupled to a first buffer 408. When the first isolator circuit is enabled, preferably through the select line 311, the offset LO signal 319 is generated as isolated LO signal 310 at the output of the first buffer 408. When the isolator circuit is disabled a high impedance is presented at the output of the first buffer 408. The second isolator circuit includes a second driver circuit 402 having an input coupled to the second LO synthesizer 316 and an output coupled to a second buffer 404. When the second isolator circuit is enabled the second LO synthesizer signal 314 is provided as the isolated LO signal 310 at the output of the second buffer 404. When the second isolator circuit is disabled a high impedance is presented to the output of the second buffer 404. The outputs of the two buffers are coupled together as isolated LO signal 310. Neither isolator circuit is enabled at the same time thereby providing isolation between the two frequency sources. In addition, the selection of the synthesizer source allows turn off of the non-used synthesizer in the TDD system, the offset LO synthesizer 318.

Routing of the LO signals from either of the two synthesizer circuits, second LO synthesizer 316 or offset LO synthesizer 318, is preferably performed using a pair of tri-stating differential current mode transmit drivers and receive buffers for the first and second drivers 406, 402 and first and second buffers 408, 404.

The offset LO synthesizer 318 is coupled to the input of a first differential driver 406, the second LO synthesizer 316 is coupled to the input of a second differential driver 402. The synthesizer select line 311 controls the turning on and turning off of drivers 402, 406 and buffers 404, 408. For the FDD system the synthesizer select line 311 goes high, turning on the first differential driver 406 and routing a differential current mode signal 407 to the first RX buffer 408 which is also turned on by the synthesizer select signal 311. The RX buffer 408 translates the differential signal 407 into a single ended voltage mode output and presents it as isolated LO signal 310 for the modulator 317. The synthesizer select signal 311 is also coupled to a logic gate, such as an inverter 420, which inverts the select signal 311 to a select/signal 416. The select/signal 416 is coupled to the second differential driver 402 and the second RX buffer 404. With the select/signal 416 at a logic level low, the second driver 402 and second buffer 404 are turned off, and a high impedance is presented at the output of the second RX buffer which is tied to the output of the first RX buffer 408.

In the TDD system, the synthesizer select signal 311 goes low turning off the first driver 406 and first buffer 408 and presenting a high impedance to the output of the first buffer. The inverter 420 inverts the synthesizer select signal 311 to a logic level high and select/signal 416 turns on the second driver 402 and second buffer 404. The second LO synthesizer signal 314 is translated into a differential current mode signal 403 at the output of the second driver 402. The differential current mode signal 403 is then coupled to the second RX buffer 404 to generate a single ended voltage mode output presented as the LO signal 310.

Only one driver / receiver pair is enabled at a time (402, 404 or 406, 408) corresponding to the respective synthesizer block (316, or 318) that is supplying the LO to the modulator 317. The single ended voltage mode outputs from the current mode receivers tie together to produce the received LO signal 310. The routing of the LO signal as a differential current mode signal minimizes the capacitive coupling from the respective LO source to other nearby circuits, because the voltage changes along the interconnect lines are very small. The differential signal also tends to cancel any common mode coupling of noise from other collocated circuits. In this manner, good isolation is achieved between the frequency sources and any other susceptible circuits or transmitter circuit blocks. Testing has been performed with both synthesizer blocks (316, 318) running where one is supplying the LO to the modulator. The measured isolation at the modulator 317 is below 65 dB at 250 MHz (megahertz). Furthermore, the offset synthesizer can be turned off while the TDD system is enabled, providing a reduction in current drain.

The receive path is common for both the FDD and TDD systems. An RF signal is received at antenna 340, coupled through antenna coupler 334 to the RX path as RX signal 342. The RX signal 342 is amplified at amplifier 346 and then mixed at RX mixer 346 with the main LO signal 322, generated from the main LO synthesizer 320. The RX mixer 346 generates an IF carrier signal 348 that gets combined with the second LO signal 314 at the ZIF 350 and converted to a RX baseband signal 352. The RX baseband signal 352 is then processed in controller section 306 and converted to audio at speaker 354.

The preferred embodiment as described by the invention uses the synthesizer controller 312 to optimize isolation between two different frequency sources so that a common architecture can be used for both TDD and FDD systems. The combination of the two architectural platforms in one integrated circuit brings the cost of the device down by allowing use of the same IC for different radio systems or providing dual architectural platforms in a single radio. In addition, the selection of the LO source in this architecture allows the non-used synthesizer source to be turned off, the offset LO synthesizer 318 in TDD systems, and therefore considerable current drain savings can be obtained. Another advantage of the dual architecture system is that the second LO synthesizer can be used in both TDD and FDD systems, eliminating the need for an independent synthesizer for the transmit mode in TDD. The second LO synthesizer acts as a common synthesizer in the receive modes of both TDD and FDD systems.

By combining the two architectural platforms, the cost of designing radios and the time involved in designing and laying out radio systems is decreased. Common radio test fixtures and integrated circuit test fixtures can be used thus reducing testing costs and test time. Furthermore, the isolation scheme as described by the invention reduces coupling problems and allows unused portions of the circuitry to turn off, providing a current drain savings to the overall radio product.

What is claimed is:

1. A radio providing first and second radio architectures, comprising:
   a controller section for providing a select signal and a transmit baseband signal;
   an integrated circuit, including:
      a synthesizer controller for controlling the selection of the first or second radio architecture, the synthesizer controller having first and second inputs, a select input for receiving the select signal, and an output for providing an isolated local oscillator (LO) signal;
      a main LO synthesizer providing a main LO signal;
      an offset LO synthesizer providing an offset LO signal to the first input of the synthesizer controller;
      a second LO synthesizer providing a second LO signal to the second input of the synthesizer controller;
      a modulator for combining the isolated LO signal and the transmit baseband signal to form a modulated intermediate frequency (IF) signal;
      a transmit mixer for mixing the modulated IF signal and the main LO signal and generating a transmit carrier signal; and said synthesizer controller comprises:
         a first isolator circuit having an input coupled to the offset LO signal and having a first isolator output;
         a second isolator circuit having an input coupled to the second LO signal and having a second isolator output; and
         the first isolator output and the second isolator output are coupled together to provide a single ended voltage mode output as the isolated LO signal in response to the select signal, and either the first isolator circuit or the second isolator circuit is enabled at one time, when the first isolator circuit is enabled the first radio architecture is enabled, and when the second isolator circuit is enabled the second radio architecture is enabled.

2. A radio as described in claim 1, wherein the first isolator circuit comprises:
   a first driver circuit having an input coupled to the offset LO signal and providing a differential current mode signal; and
   a first buffer having an input coupled to the differential current mode signal of the first driver and providing the isolated LO signal to the modulator in response to the select signal.

3. A radio as described in claim 2, wherein the first driver circuit comprises:
   a first tri-state differential current mode driver providing the differential current mode signal when the select signal is a logic level high.

4. A radio as described in claim 3, wherein the first buffer comprises:
   a first tri-state differential current mode receive buffer coupled to the differential current mode signal of the first tri-state differential current mode driver and providing a single-ended voltage mode output when the select signal is a logic level high and providing a high impedance output when the select signal is a logic level low to the modulator.

5. A radio as described in claim 1, wherein the second isolator circuit comprises:
   a second driver circuit having an input coupled to the second LO signal and providing a differential current mode signal; and
   a second buffer having an input coupled to the differential current mode signal of the second driver and providing the isolated LO signal to the modulator in response to the select signal.

6. A radio as described in claim 5, wherein the second driver circuit comprises:
   a second tri-state differential current mode driver providing the differential current mode signal when the select signal is a logic level low.

7. A radio as described in claim 6, wherein the second buffer comprises:
   a second tri-state differential current mode receive buffer coupled to the differential current mode signal of the second tri-state differential current mode driver and providing a single-ended voltage mode output when the select signal is a logic level low and providing a high impedance output when the select signal is a logic level high to the modulator.

8. A radio as described in claim 1, wherein the radio further comprises:
   a receive mixer for mixing an RF signal with the main LO signal and generating a receive IF carrier signal;
   a zero IF section for combining the second LO signal with the receive IF carrier signal and producing a receive baseband signal; and
   the offset LO synthesizer being turned off when the select signal is a logic level low.

9. A radio as defined in claim 1, wherein the first radio architecture provides a Frequency Division Duplex mode.

10. A radio as defined in claim 1, wherein the second radio architecture provides a Time Division Duplex mode.

11. An integrated circuit providing first and second radio architectures, comprising:
   a synthesizer controller having a select input for selecting between the first and second radio architecture and providing an isolated local oscillator (LO) signal;
   an offset LO synthesizer providing an offset LO signal to the synthesizer controller; and
   a second LO synthesizer providing a second LO signal to the synthesizer controller;
   a first isolator circuit having an input coupled to the offset LO signal and providing a differential current mode signal in response to the first radio architecture being selected;
   a second isolator circuit having an input coupled to the second LO signal and providing a differential current mode signal in response to the second radio architecture being selected; and the first isolator having an output and the second isolator having an output, wherein the first and second isolator outputs are coupled together to provide a single ended voltage mode output as the isolated LO signal in response to the select signal, and either the first isolator circuit or the second isolator circuit is enabled at one time, when the first isolator circuit is enabled the first radio architecture is enabled, and when the second isolator circuit is enabled the second radio architecture is enabled.

12. An integrated circuit as described in claim 11, wherein the first radio architecture comprises a Frequency Division Duplex (FDD) architecture.

13. An integrated circuit as described in claim 11, wherein the second radio architecture comprises a Time Division Duplex (TDD) architecture.

* * * * *